United States Patent [19]

Sala

[11] 4,326,609
[45] Apr. 27, 1982

[54] DEVICE FOR AUTOMATICALLY REDUCING EXCESS PLAY IN MOVABLE PARTS OF BRAKES

[75] Inventor: Franco Sala, Lugano, Switzerland

[73] Assignee: Steelyamamoto International Company Ltd., Schaan, Liechtenstein

[21] Appl. No.: 125,998

[22] Filed: Feb. 29, 1980

[30] Foreign Application Priority Data

Jun. 21, 1979 [IT] Italy ............................. 23785 A/79

[51] Int. Cl.³ .......................................... F16D 65/58
[52] U.S. Cl. ........................................... 188/196 BA
[58] Field of Search ........... 188/196 BA, 196 B, 200

[56] References Cited

U.S. PATENT DOCUMENTS

| | | | |
|---|---|---|---|
| 3,949,840 | 4/1976 | Cumming et al. | 188/196 BA |
| 4,039,055 | 8/1977 | Meyer et al. | 188/196 BA |
| 4,057,128 | 11/1977 | Coupland | 188/196 BA |
| 4,071,120 | 1/1978 | Hagin | 188/196 BA |

Primary Examiner—Hiram Bernstein
Attorney, Agent, or Firm—Fitch, Even, Tabin, Flannery & Welsh

[57] ABSTRACT

A device for automatically reducing excess play in moving parts of brakes comprises a stem moved axially from a rest position to an operative position.

The stem can be threaded into a coupling lever such as to accommodate the drift of the rest position, to this end the stem being furthermore provided with a projecting arm imparting thereto a play compensating torque by engagement against an end-of-travel detent.

3 Claims, 9 Drawing Figures

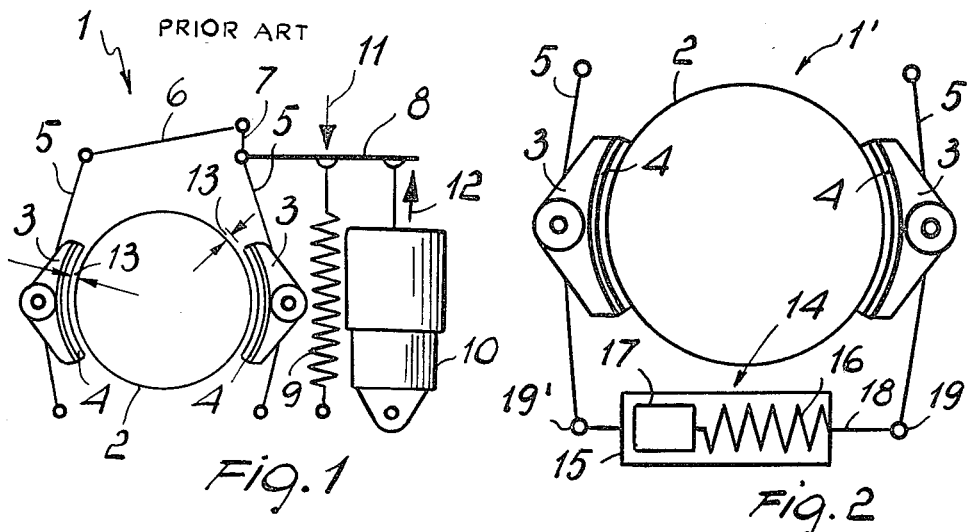
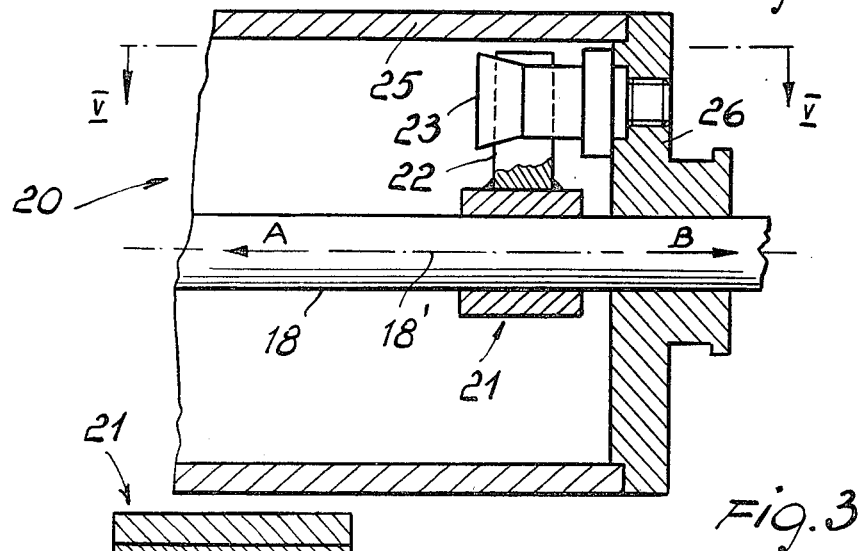

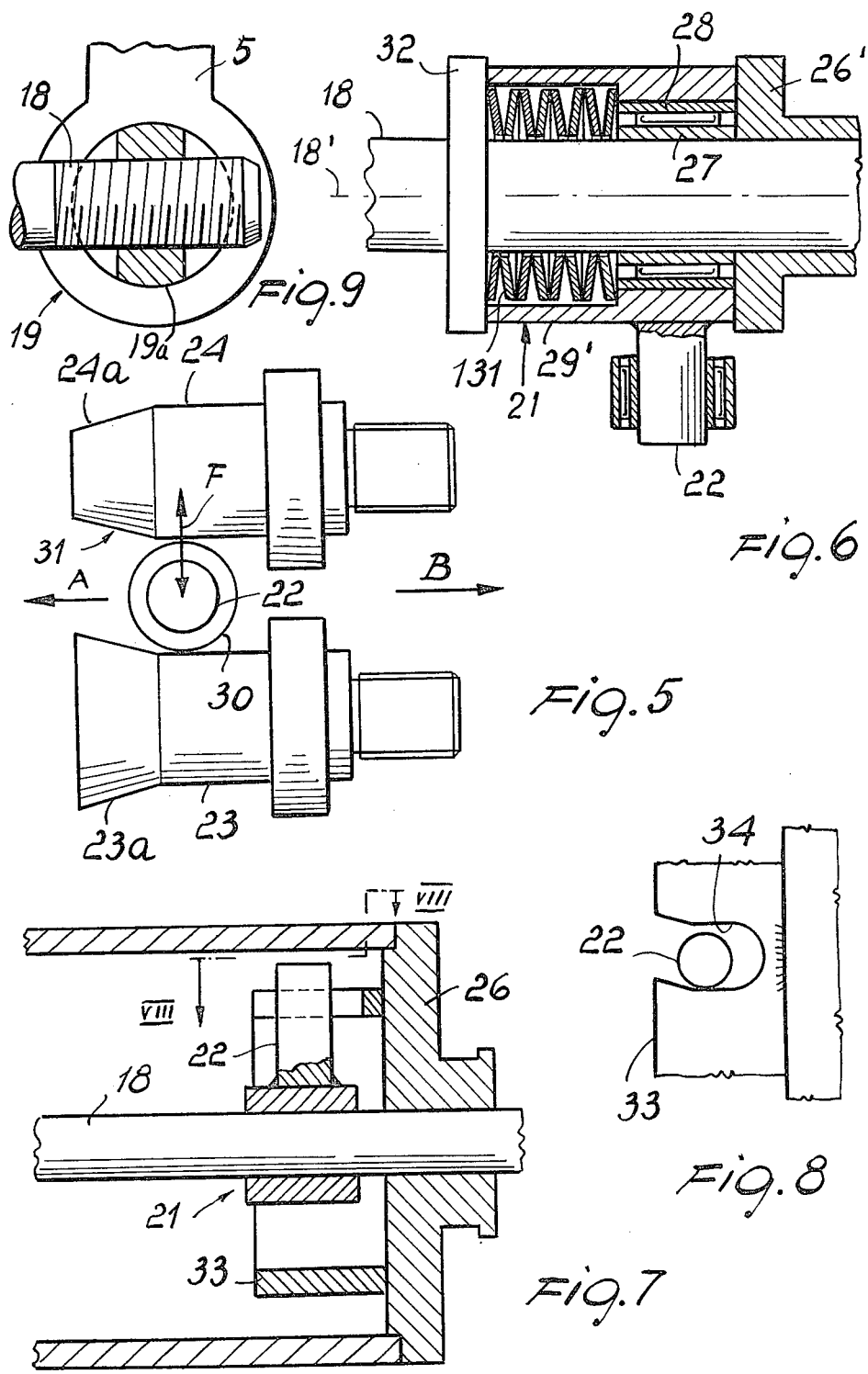

4,326,609

DEVICE FOR AUTOMATICALLY REDUCING EXCESS PLAY IN MOVABLE PARTS OF BRAKES

BACKGROUND OF THE INVENTION

This invention relates to a device for automatically reducing excess play in a movement, such as the movement occurring in brake shoes, brake systems, or the like, in which the device is incorporated.

The problem posed by an excessive amount of play in a movement and related controls, such as in brake shoes, is a well known one to the experts, and considerable effort has gone into its study, with a view to preventing or at least accommodating it.

Whilst brakes are not the only type of application whereto this invention is directed, specific reference will be made herein to them, inasmuch as they represent the best known and more frequently encountered of cases, and accordingly the most suitable example from a didactic standpoint.

In a brake including shoes and linings, the play or free movement in question corresponds to the amount of idle movement of the shoes before they engage a wheel to be braked, either through a drum or disk applicator; as the wear of the frictional linings progresses, the play and accordingly the idle movement also increases. This drawback has various effects, depending on the brake design and the particular utilization thereof. As far as this problem is concerned, all of the following shoe, or band, or disk brakes fall into a common class: braking systems intended for use with capstans, hoists, overhead traveling cranes, elevators, cableways, chairlifts, conveyors, etc.; and it is to such installations that this invention is particularly directed, albeit not exclusively to them, as mentioned already. In FIG. 1 of the accompanying drawings, there is shown a typical brake layout for installations such as the ones mentioned above, reference being made to that diagram to further clarify the terms of the problem. The reference numeral 1 designates generally the brake assembly and related controls, 2 designates the brake wheel or pulley, adapted for frictional engagement between two opposite brake shoes 3 having frictional linings 4 facing the contacting surface of the wheel. The shoes are both carried and moved by levers 5 which are connected to articulated rods 6,7,8, the latter whereof is positively actuated by a spring 9 and released through an electromagnetic servo 10, as indicated by the arrows 11 and 12. Between the frictional linings 4 of the shoes and the contacting surfaces of the wheel 2, there is a gap or clearance 13, which has originally a minimum preset value that increases thereafter continuously as the wear of the lining 4 progresses. The increasing gap or play 13 results in all the levers and articulated rods operating in varied and no longer optimal positions, until the electromagnet reaches its stroke limit, which prevents any further utilization of the braking system. However, already before this extreme condition of no utilization is reached, the spring will relax, which causes the system to operate at a reduced power. In order to utilize the entire thickness or depth of the lining 4, without restoring the initial conditions through suitable re-adjustments, it would be necessary to provide much longer levers and rods, a much more powerful spring, and an electromagnet of proportionally larger dimensions, or alternatively reduce the link 6 by an amount proportional to the play increase. Besides the considerable and unacceptable cost increase involved, that approach is inadequate, owing mainly to bulk considerations as the experts will readily recognize. Thus, it has become necessary, from the very beginning, to provide a means of adjusting the shoes on their related levers, e.g. to restore the increased play 13 to its initial value. However, such an approach is scarcely a desirable one, because it involves an appreciably high added maintenance cost, and even more so because any occasional delay or higher wear rate could results in poor operational effectiveness and troublesome malfunctions. Understandably, attempts have been made to reduce the excess play automatically without discontinuing the operation. Since it is not convenient to adjust the shoes on their related levers, provision has been made for approaching the two levers 5, in their inoperative positions, which carry the shoes, such as by shortening the link 6, which is suitably threaded and threadably engaged with a sleeve, in a manner known per se. The threading movement is in this instance controlled upon occasion by the travel or stroke excess of the electromagnet or of the lever 8. But this is only possible and convenient in those cases where room is available for such attachments, which cannot fail to increase the overall bulk, albeit moderately. In a majority of cases, this is not possible, however, or is undesirable. Thus, the need is felt for a solution to this important and frequently encountered problem which is universally acceptable.

SUMMARY OF THE INVENTION

The main task of this invention is to provide a universally acceptable solution, even in restricted bulk conditions, to the aforementioned problem, by providing a device for automatically reducing excess play in a movement, such as the movement occurring in brake shoes, brake actuating mechanisms, and the like.

This task is achieved according to the invention by a compensator device for automatically reducing excess stroke or play in moving parts of a mechanism, such as a brake mechanism or brake actuating mechanism and the like, wherein a transmission mechanism transmitting motion from an actuator to said moving parts includes at least one axially movable motion transmitting rod-like member and at least one coupling member of the transmission mechanism connected with said rod-like member, wherein, according to the improvement, said rod-like member and said coupling member have coaxial screw-thread means providing screw-thread connection therebetween selectively allowing relative coaxial compensation movement therebetween upon relative coaxial rotation thereof and wherein said rod-like member has crank means and said transmission mechanism has cam means, said crank means being in cam follower engagement with said cam means, said cam means having a first cam surface portion parallel with the axis of said rod-like member and a second cam surface portion inclined with respect to the axis of said rod-like member thereby to prevent relative rotation between said rod-like member and said coupling member as long as the stroke of said rod-like member is within a normal range within which the engagement between said crank means and said cam means is maintained within the area of said first cam surface portion and to cause relative angular displacement between said rod-like member and said coupling member when the stroke of said rod-like member exceeds said normal range and the camming engagement between said crank means and said cam means occurs at said second cam surface portion.

BRIEF DESCRIPTION OF THE DRAWINGS

The invention's features and advantages will be detailed hereinafter through the description of a presently preferred embodiment thereof, in conjunction with the accompanying schematic drawings, where:

FIG. 1 is a diagram illustrating a brake assembly and related controls or actuating mechanism, as typifying the state of the art;

FIG. 2 is a diagram similar to FIG. 1 but modified to show how the device according to the invention can be incorporated;

FIG. 3 is a device according to this invention, illustrating the basic components of the inventive device, in axial sectional view;

FIG. 4 is an axial section detail view of this device;

FIG. 5 is a view taken along the line V—V of FIG. 3;

FIG. 6 is a detail view similar to FIG. 4 but illustrating a modification of the device;

FIG. 7 is a sectional view similar to FIG. 3, showing a variation of the embodiment presently preferred;

FIG. 8 is a view taken along the line VIII—VIII of FIG. 7, with parts removed for clarity; and FIG. 9 is a diagrammatic side view partially in section of the hinged screw-thread coupling.

DESCRIPTION OF A PREFERRED EMBODIMENT

The power brake unit with controls, schematically illustrated in FIG. 1, inasmuch as typifying conventional brake designs, has already been discussed and explained. For the application of the device according to this invention, a further simplified brake unit or assembly design illustration has been selected which only includes the most basic components, as against the one shown in FIG. 1, such as may be used with a hoist, where severe space requirements are known to exist. Such a layout could not incorporate, heretofore, any forms of automatic play control because its compact size did not permit the installation of conventional play control systems. Similar or equivalent parts have been designated with the same reference numerals and symbols, the power brake unit being indicated at 1'. The block 14 includes a dynamic cylindrical body 15, a spring 16, and a ferromagnetic core 17 of an electromagnet. The spring and core engage on one side with a stem 18 which is slidable in the body 15 and secured, specifically by threading, to the oscillating end 19 of a lever 5, and on the other side with the inside of the body 15, which is rigid with the oscillating end 19' of the other lever 5 carrying the brake shoes. Thus, the block 14 is a brake actuator which moves the two shoe-carrying levers 5 to and from the wheel 2 associated with the brakes. Theoretically at least, the arrangement of FIG. 2 is the most suitable for an explanation of the invention. The aim is to compensate the surface wear of the linings 4 and the consequent increase of the idle movement or travel distance 13 by correspondingly screwing the stem 18 into the hinge pin 19a of the articulation end 19 of the shoe carrying lever 5 (FIG. 9), to thus overcome the problems and difficulties indicated above. FIGS. 3, 4 and 5 show how this invention provides a solution. The device 20, which illustrates the essence of the invention may be incorporated in the cylindrical body 15 of the actuating block 14, or may be inserted in series between the block 14 and end 19, on the stem 18 to be adjusted. On the stem 18, there is mounted a free-wheeling hub 21, wherefrom a torque pin or crank arm 22 projects which is slidable between cam surfaces formed by two guides 23 and 24 (FIG. 5) in a direction parallel to the axis of the stem 18. More specifically, the stem 18 is mounted for sliding movement through a cylindrical case or tube 25 which is suppoted by two flanges 26, FIG. 3 showing but one such flange.

The free-wheeling hub 21 comprises a bushing 27 (FIG. 4) keyed to the stem 18, a ratchet gear sleeve 28, mounted on the bushing 27 and forming a unidirectional ratchet gear coupling therewith, in a manner known per se in several engineering branches. The sleeve 28 is surrounded by a casing 29 housing the coupling 21, rigid with the sleeve 28, and whereto the torque pin or arm 22 is rigidly attached. To reduce the friction and wear of the pin as guided by the guides 23 and 24, a rolling bearing 30 is mounted thereon. The two guides 23 and 24 are two threaded cylindrical bars or studs which engage threadably with the flange 26 and terminate in respective conical heads 23a and 24a set to protrude, one in a diverging direction and the other in a converging one. The two guides 23 and 24 define together a guiding runway having a normal axial raceway portion, and an inclined or sloping terminal extended raceway portion, respectively at the cylindrical and conical portions 23a and 24a of the guides.

The instant device for reducing excess play, 20, operates as follows.

As the play 13 increases, the idle portion of the shoe actuating and releasing stroke increases proportionally, as indicated by the arrows A and B for the stem 18. Normally, i.e. as long as the play 13 does not exceed predetermined limits, the movement of the stem 18, rigid with the lever 5, with respect to the cylindrical tube 25, rigid with the cylindrical body 15 and with the other shoe-carrying lever 5, is of a magnitude such that the pin 22 projecting therefrom remains within the axial portion of the runway 31. Upon the wear exceeding such predetermined limits, the pin 22 reaches its travel limit and moves along the oblique portion between the conical heads 23a and 24a of the runway. The torque pin or arm 22 is forced to perform along with the stem 18 a rotational movement about the axis 18' of the stem proportional to the deviation attained by the pin 22 in the oblique portion relative to its axial line of travel. However, the stem 18 is threaded with one end into the end 19 of the lever 5 shown on the right-hand side of FIG. 2, and can be turned further in as shown by the torque arrow F in FIG. 5, thereby each time the pin 22 starts along the oblique path defined by 23a, 24a, the stem 18 is correspondingly rotated and threaded further into the end 19 of the lever 5, thus reducing the excess play by an equal amount. The resulting effect is one of mechanical or servomechanical opposing reaction. From the foregoing description, it will be apparent that the torque arm 22, optionally provided with the rolling bearing 30, behaves like a cam follower, the guided runway 31 acting as a positive cam, i.e. as a cam provided with dual follower confining walls. The path followed by the cam follower, namely by the axis of the cam follower and of its arm 22 is approximately a section of a helix. If the pitch of the threads between the stem 18 and lever 5 is made equal to the pitch of said oblique cam 31, the stem will be exactly shortened by an amount equal to the travel distance, as measured in the axial direction, covered by the torque arm 22 along the inclined portion of the runway 31, or in other words by an amount equal to the excess play. At the next brake actuation, the stem will reach exactly the cam elbow, since it has been adjusted automatically. It is only after more wear has taken place that the stem will increase its travel distance and reach once again the adjustment region. It will be recognized that, since the response is an immediate one, no appreciable excess play will ever build up beyond the predetermined limit, but is rather removed as it forms.

In FIG. 6, the assembly including the free-wheel 21 and radial arm 22 has been stiffened by means of Belleville washers 131 which urge the free-wheel out of engagement against a flanged stop 26' on the flange 26; the washers engage on the other side a small collar 32 on the stem 18 which acts as a shouldering piece. The Belleville washers are accomodated under an extension of the casing 29' of the free-wheel. The stiffening or braking of such washers is intended for preventing the free-wheel from performing unintentional rotational movements in its free rotation direction, owing to vibration or impulses.

FIGS. 7 and 8 illustrate a variation of the invention embodiment, wherein the guide for the radial arm 22, instead of comprising the two bars 23 and 24, is in the form of a cylindrical housing or lug 33, laid coaxial with the stem 18, which is welded with one base to the flange 26, internal to the tube 25. Through the housing or lug 33, a longitudinal slot 34 with a portion parallel to the stem 18 and a portion inclined thereto is cut which acts as a guide or grooved cam member, wherealong the radial arm is caused to slide, optionally as equipped with the bearing 30. Obviously, the operation principle is the same.

As may be seen, the concept of making the stem 18 self-reducing by simply applying thereto a ratcheting torque arm which is actuated by the regulated travel movement of the stem affords the possibility of providing a brake and the like regulating device of a surprisingly compact or minimized size, thereby any installation problems encountered in even the most severe of space restrictions have been eliminated. And the experts in the art will recognize that this further results in a solution which is simple and economical construction-wise, as well as most reliable in operation.

Notwithstanding the simplicity of its basic design, which is an essential benefit afforded by the invention, in practicing the invention many variations may be introduced which fall within the scope of this invention whenever related to the teachings provided hereinabove and summarized in the appended claims.

What is claimed is:

1. A compensator device for automatically reducing excess stroke or play in moving parts of a mechanism, such as a brake mechanism or brake actuating mechanism and the like, wherein a transmission mechanism transmitting motion from an actuator to said moving parts includes at least one axially movable motion transmitting rod-like member and at least one coupling member of the transmission mechanism connected with said rod-like member, wherein, according to the improvement, said rod-like member and said coupling member have coaxial screw-thread means providing screw-thread connection therebetween selectively allowing relative coaxial compensation movement there-between upon relative coaxial rotation thereof and wherein said rod-like member has crank means and said transmission mechanism has cam means, said crank means being in cam follower engagement with said cam means, said cam means having a first cam surface portion parallel with the axis of said rod-like member and a second cam surface portion inclined with respect to the axis of said rod-like member thereby to prevent relative rotation between said rod-like member and said coupling member as long as the stroke of said rod-like member is within a normal range within which the engagement between said crank means and said cam means is maintained within the area of said first cam surface portion and to cause relative angular displacement between said rod-like member and said coupling member when the stroke of said rod-like member exceeds said normal range and the camming engagement between said crank means and said cam means occurs at said second cam surface portion.

2. A device according to claim 1, wherein said cam means comprise a cylindrical lug surrounding and coaxial with said rod-like member and a slot cut into said lug and having a portion parallel to said rod-like member and a another portion inclined thereto.

3. A compensator device for automatically reducing excess stroke or play in moving parts of a mechanism, such as a brake mechanism or brake actuating mechanism and the like, wherein a transmission mechanism transmitting motion from an actuator to said moving parts includes at least one axially movable motion transmitting rod-like member and at least one coupling member of the transmission mechanism connected with said rod-like member, wherein, according to the improvement, said rod-like member and said coupling member have coaxial screw-thread means providing screw-thread connection therebetween selectively allowing relative coaxial compensation movement therebetween upon relative coaxial rotation thereof, wherein said rod-like member has crank means and said transmission mechanism has cam means, said crank means being in cam follower engagement with said cam means, said cam means having a first cam surface portion parallel with the axis of said rod-like member and a second cam surface portion inclined with respect to the axis of said rod-like member thereby to prevent relative rotation between said rod-like member and said coupling member as long as the stroke of said rod-like member is within a normal range within which the engagement between said crank means and said cam means is maintained within the area of said first cam surface portion and to cause relative angular displacement between said rod-like member and said coupling member when the stroke of said rod-like member exceeds said normal range and the camming engagement between said crank means and said cam means occurs at said second cam surface portion, wherein said cam means comprise two spaced apart studs extending parallel to said rod-like member and having each a cylindrical portion and one of said studs having a convergent conical end portion and the other of said studs having a divergent conical end portion which are complementary to each other, and further comprising ratchet gear means for connecting said crank means to said rod-like member to provide rigid rotatory relationship therebetween in one direction and freewheel relationship in the opposite direction of rotation thereof.

* * * * *